United States Patent
Rogers et al.

(10) Patent No.: US 9,129,239 B2
(45) Date of Patent: Sep. 8, 2015

(54) DRIVER/PARENT ARRIVAL NOTIFICATION SYSTEM AND METHOD OF NOTIFICATION

(75) Inventors: Jon T. Rogers, Fort Lauderdale, FL (US); Gordon Mackay, Houston, TX (US)

(73) Assignee: DISCOVERY SCHOOLS, INC., Fort Lauderdale, FL (US)

( * ) Notice: Subject to any disclaimer, the term of this patent is extended or adjusted under 35 U.S.C. 154(b) by 833 days.

(21) Appl. No.: 13/434,133

(22) Filed: Mar. 29, 2012

(65) Prior Publication Data

US 2013/0256396 A1     Oct. 3, 2013

(51) Int. Cl.
G06F 17/00     (2006.01)
G06Q 10/06    (2012.01)
G06Q 50/10    (2012.01)
G06Q 50/20    (2012.01)

(52) U.S. Cl.
CPC ............... *G06Q 10/06* (2013.01); *G06Q 50/10* (2013.01); *G06Q 50/20* (2013.01)

(58) Field of Classification Search
USPC .................. 235/375, 382, 384; 705/14.58, 32
See application file for complete search history.

(56) References Cited

U.S. PATENT DOCUMENTS

| | | | |
|---|---|---|---|
| 5,218,344 | A | 6/1993 | Ricketts |
| 5,737,710 | A | 4/1998 | Anthonyson |
| 5,812,070 | A | 9/1998 | Tagami et al. |
| 6,278,936 | B1 | 8/2001 | Jones |
| 6,658,348 | B2 * | 12/2003 | Rudd et al. ................ 701/516 |
| 6,696,981 | B1 | 2/2004 | Hashimoto |
| 6,700,506 | B1 | 3/2004 | Winkler et al. |
| 6,992,566 | B2 | 1/2006 | Striemer |
| 7,262,696 | B2 | 8/2007 | Aota et al. |
| 7,377,426 | B1 * | 5/2008 | Makeever ................ 235/382 |
| 7,545,283 | B2 | 6/2009 | Ikemori et al. |
| 8,442,277 | B1 * | 5/2013 | Newman et al. ............ 382/117 |
| 2003/0137435 | A1 | 7/2003 | Haddad et al. |
| 2006/0164259 | A1 | 7/2006 | Winkler et al. |
| 2007/0024469 | A1 | 2/2007 | Chou |
| 2007/0078908 | A1 | 4/2007 | Rohatgi et al. |
| 2007/0109134 | A1 * | 5/2007 | Dugan et al. ............ 340/573.1 |
| 2007/0229217 | A1 | 10/2007 | Chen et al. |
| 2007/0262862 | A1 | 11/2007 | Barrett et al. |
| 2008/0001704 | A1 * | 1/2008 | Roston ...................... 340/5.8 |
| 2010/0214134 | A1 | 8/2010 | Weisser et al. |
| 2011/0059693 | A1 | 3/2011 | O'Sullivan |
| 2014/0333412 | A1 * | 11/2014 | Lewis et al. ................. 340/5.2 |

FOREIGN PATENT DOCUMENTS

WO    WO2011104727    9/2011

* cited by examiner

*Primary Examiner* — Ahshik Kim
(74) *Attorney, Agent, or Firm* — The Concept Law Group, P.A.; Scott D. Smiley; Mark C. Johnson

(57) ABSTRACT

A system for providing a user/child with the arrival status of a driver/parent and method therefore includes providing a mobile code carrier, a code reader that identifies a code stored on the code carrier, a processor communicatively coupled to the code reader, a memory communicatively coupled to the processor storing a data base that includes a data structure, and a plurality of displays each communicatively coupled to the processor and located in one of a plurality of disparate locations within a building. The method further includes identifying the code, associating the code with a target and at least one location within the building, and displaying to one of the plurality of displays where the target is located a message indicating that the driver/parent has arrived.

20 Claims, 5 Drawing Sheets

DRIVER/PARENT ARRIVAL NOTIFICATION SYSTEM AND METHOD OF NOTIFICATION

FIELD OF THE INVENTION

The present invention relates generally to communicating the arrival of a parent/driver to a custodian of a child, and, more particularly, relates to a system and method for displaying to a child and/or a custodian of a child, an announcement of the parent/driver's arrival at a location where the child is being cared for.

BACKGROUND OF THE INVENTION

With the exception of a small minority of children that are homeschooled, virtually all children in the United States will attend a learning institution to receive their formal education. These institutions include both public and private schools and can include preschools and daycare centers. Typically, young children attending these institutions will be dropped off in the morning by their parents and picked up by the parents later in the day after the school session has ended. Generally, the dropping off process is quite organized, as each vehicle transporting one or more children pulls up to a designated area of the facility and the driver responsible for that the children watches as they enter the building safely. In some schools or for certain grade levels, the parents park and walk the children into the facility. The difficulty, however, occurs when the day ends and the children need to be released back to the parents/guardians.

The most popular method of releasing children at the end of the school day is to simply open the door of each classroom and allow all of the children in the building or in a particular grade to make their own way out of the building. This method has its disadvantages, particularly when it comes to the younger children. For one, the children may not immediately make their way to the pickup area of the building. Second, once at the pickup area, they may not be mature enough to avoid entering the traffic lanes. This issue is exacerbated by the large number of students that are released all at the same time, which presents many distractions for these young students. In addition, there is no way of ensuring that children will not wander away from the pickup area, thereby creating traffic issues and introducing the possibility of the child being lost or even abducted.

As a measure of safety, many schools have charged the teachers or other adults within the building with the responsibility of walking groups of children to the pickup area and monitoring those children until their parent or other authorized individual, e.g., carpool driver, arrives to pick up the child. The system ensures that all the children make their way to the proper area, ensures that the children's safety is being monitored, and provides a check to ensure that the children are entering the proper vehicles.

The second system, however, has its drawbacks. For one, it is labor intensive, requiring a teacher for each class to be outside the building and constantly monitoring the drivers of the vehicles or pedestrians coming to pick up the children. It also requires an entire group of children to be at the front of the building at the same time, which is generally rather chaotic. In addition, the system breaks down when a teacher is out sick and a substitute teacher, not especially familiar with the children or their parents/guardians, is placed in charge of matching the children with the adults picking them up. Furthermore, having one person, e.g., a teacher, in charge of matching children with the parents/guardians that are there to pick them up can be very difficult when a parent has granted the authority to a third-party, e.g., the parent is ill and has asked a friend to pick up their child. In these situations, the teacher will have to spend additional time ensuring that the person is actually authorized to receive that child. Similar confusing situations are created, for instance, in the carpool arrangements where one parent will agree to pick up a plurality of children belonging to other parents participating in the carpool. This creates a number of organizational difficulties and potential breaches in security for the person in charge of properly releasing the children.

Some schools or other institutions that are particularly concerned with safety utilize high-tech systems for monitoring the safety of children while in the custody of third parties by tracking the child's location while in the custody of the third party. These systems keep records of the positional data of the child, and notify the third party and/or his or her guardians if/when the child strays into an undesired location. These communication/safety systems, however, are designed only for tracking and/or record keeping.

Some known prior-art systems automatically identify the arrival of a driver/parent on campus. These systems include recording a parent or guardian's biometric data and then electronically sending an acknowledgment of the parent's presence on campus to the supervising party once a match to the recorded data is received and identified. These known systems, however, require the parent/guardian to present themselves to the supervising party for a face-to-face encounter that causes the supervising party to direct his or her attention away from the other children. These systems further disrupt the supervising party and other children in certain situations, such as a teaching or testing environment, for example. Furthermore, as these systems are primarily based upon biometric data associated with a person that is pre-registered, it is difficult to transfer pick-up responsibilities to another person, such as an un-registered family member, friend, or someone in a car-pool, when needed, for convenience or in emergency situations.

Another known system for communicating the arrival of a driver/parent includes the vehicle generating a wireless signal that is received when the vehicle is within a pre-defined distance. The vehicle's arrival is then displayed to a set area to alert the user, assuming the user may be there. These systems require all of the children to be in front of the display and create considerable confusion in common situations, such as car pools or neighbors picking up extra children as a favor.

Therefore, a need exists to overcome the problems with the prior art as discussed above.

SUMMARY OF THE INVENTION

The invention provides a parent/driver arrival notification system, in particular notification to a custodian of a child, or intended passenger of a vehicle, of the parent/driver's arrival and method therefore. The invention overcomes the hereinafore-mentioned disadvantages of the heretofore-known devices and methods of this general type and that provides notification to a child-supervising party and/or a user/child associated with a particular parent/driver, efficiently, without interruption, and with little relative cost. The invention further provides for associating a mobile identification code with the parent/driver, which is then associated with the user/child and transmitted to one or more particular locations associated with the user/child that advantageously makes sure the user/child is notified.

With the foregoing and other objects in view, there is provided, in accordance with the invention, a method of announcing a person's arrival, the method including providing a mobile code carrier, a code reader operable to identify a code stored on the mobile code carrier when the mobile code carrier is in proximity to the code reader, a processor communicatively coupled to the code reader, a memory communicatively coupled to the processor and storing a data structure associating the code with a code holder, at least one target, and at least one location where the target is located within a building, and a plurality of displays each located in one of a plurality of different locations within the building and each communicatively coupled to the processor. The method further includes identifying the code from the mobile code carrier with the code reader, then searching the data structure with the code to identify the at least one target and the at least one location where the at least one target is located within the building, and then displaying to one of the plurality of displays at the at least one location within the building a predetermined message uniquely related to the at least one target.

In accordance with another feature, an embodiment of the present invention includes searching the data structure with the code to identify a first location where a first target is located within the building and a second location where a second target is located within the building, followed by displaying to one of the plurality of displays at the first location a predetermined message uniquely related to the first target, and then displaying to one of the plurality of displays at the second location a predetermined message uniquely related to the second target.

In accordance with a further feature of the present invention, the mobile code carrier is removably couplable to a vehicle.

In accordance with yet another further feature of the present invention, the mobile code carrier is either a bar code or a RF transmitter.

In accordance with a further feature of the present invention, the building is a school and the plurality of different locations are classrooms within the school.

In accordance with a further feature of the present invention, the message related to the at least one target is an instruction to a teacher to dismiss a particular child.

In accordance with an additional feature of the present invention, the predetermined message uniquely related to the at least one target has either an identifier of the target or an identifier of a person in possession of the mobile code carrier.

In accordance with yet another further feature of the present invention, the data structure includes at least one lookup table.

In accordance with another feature, an embodiment of the present invention includes providing a target code carrier having a second code associated with the target and a second code reader located proximate the building and communicatively coupled to the processor, the second code reader operable to identify the second code stored on the target code carrier when the target code carrier is in proximity to the second code reader, while the method further includes identifying the second code from the target code carrier with the second code reader, searching the data structure for the second code to determine a code holder associated therewith, and displaying to one of the plurality of displays an alert when the code holder associated with the second code is not currently identified by the code reader as being present.

In accordance with the present invention, a driver/parent identifying system includes a mobile code carrier, a code reader operable to identify a code stored on the mobile code carrier when the mobile code carrier is in proximity to the code reader, a processor communicatively coupled to the code reader, a memory communicatively coupled to the processor and storing a data structure associating the code with a code holder, at least one target, and at least one location where the target is located within a building, and a plurality of displays each located in one of a plurality of different locations within the building and each communicatively coupled to the processor, wherein upon receiving from the code reader an identification of the code stored on the mobile code carrier, the processor searches the memory to identify the at least one location where the target is located within the building and causes one of the plurality of displays at the at least one location to display a predetermined message uniquely related to the at least one target.

In accordance with an additional feature of the present invention, the at least one target is at least two people, the at least one location is at least two rooms, with one of the at least two people each being in a separate one of the at least two rooms, and upon receiving from the code reader an identification of the code stored on the mobile code carrier, the processor displays a message on a display in a first of the at least two rooms and not on a display in a second of the at least two rooms.

In accordance with the present invention, a driver/parent identifying system has a school building located on a school campus and having at least a first classroom and a second classroom, a first electronic display monitor in the first classroom and a second electronic display monitor in the second classroom, a mobile code carrier coupled to an automobile, a code reader on the school campus and operable to identify a code stored on the mobile code carrier when the mobile code carrier enters the campus, a processor communicatively coupled to the code reader and the first and second display monitors, and a memory communicatively coupled to the processor and storing a data structure associating the code with a first student present within the school building, a guardian of the first student present within the school building, and a location where the first student present within the school building is located, wherein upon receiving from the code reader an identification of the code stored on the mobile code carrier, the processor searches the memory to identify the first student present within the building and the location where the first student present within the school building is located and displays a predetermined message on the first display when the first student present within the school building is located in the first classroom and displays the predetermined message on the second display when the first student present within the school building is located in the second classroom.

In accordance with an additional feature of the present invention, the data structure further associates the code with a second student present within the school building and a location where the second student present within the school building is located and, upon receiving from the code reader an identification of the code stored on the mobile code carrier, the processor searches the memory to identify the second student present within the building and the location where the second student present within the school building is located and displays a predetermined message on the first display when the second student present within the school building is located in the first classroom and displays the predetermined message on the second display when the second student present within the school building is located in the second classroom.

In accordance with a further feature of the present invention, the predetermined message is a message indicating that the guardian of the first student has arrived on campus.

Although the invention is illustrated and described herein as embodied in a system for notifying a user/child of a driver/ parent's arrival and method therefore, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. "Uniquely related" means any message or indicator that identifies a particular person to the exclusion of at least one other person.

A computer or communication system may include a processor (e.g., a central processing unit (CPU), a graphics processing unit (GPU), or both), a main memory and a static memory which communicate with each other. The computer processor may vary considerably in design and function. One aspect of a processor design is its architecture. Generally, the term computer architecture refers to the instruction set and organization of a processor. An instruction set is a group of programmer-visible instructions used to program the processor. The organization of a processor, on the other hand, refers to its overall structure and composition of computational resources, for example, the bus structure, a memory arraignment, and number of processing elements. A processing element, in a broad sense, is a device in a computer processor that performs logical or arithmetical operations on data it receives. For example, a processing element may be as simple as an adder circuit that sums two values, or it may be a complex as a central processing unit (CPU) which performs a wide variety of different operations.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
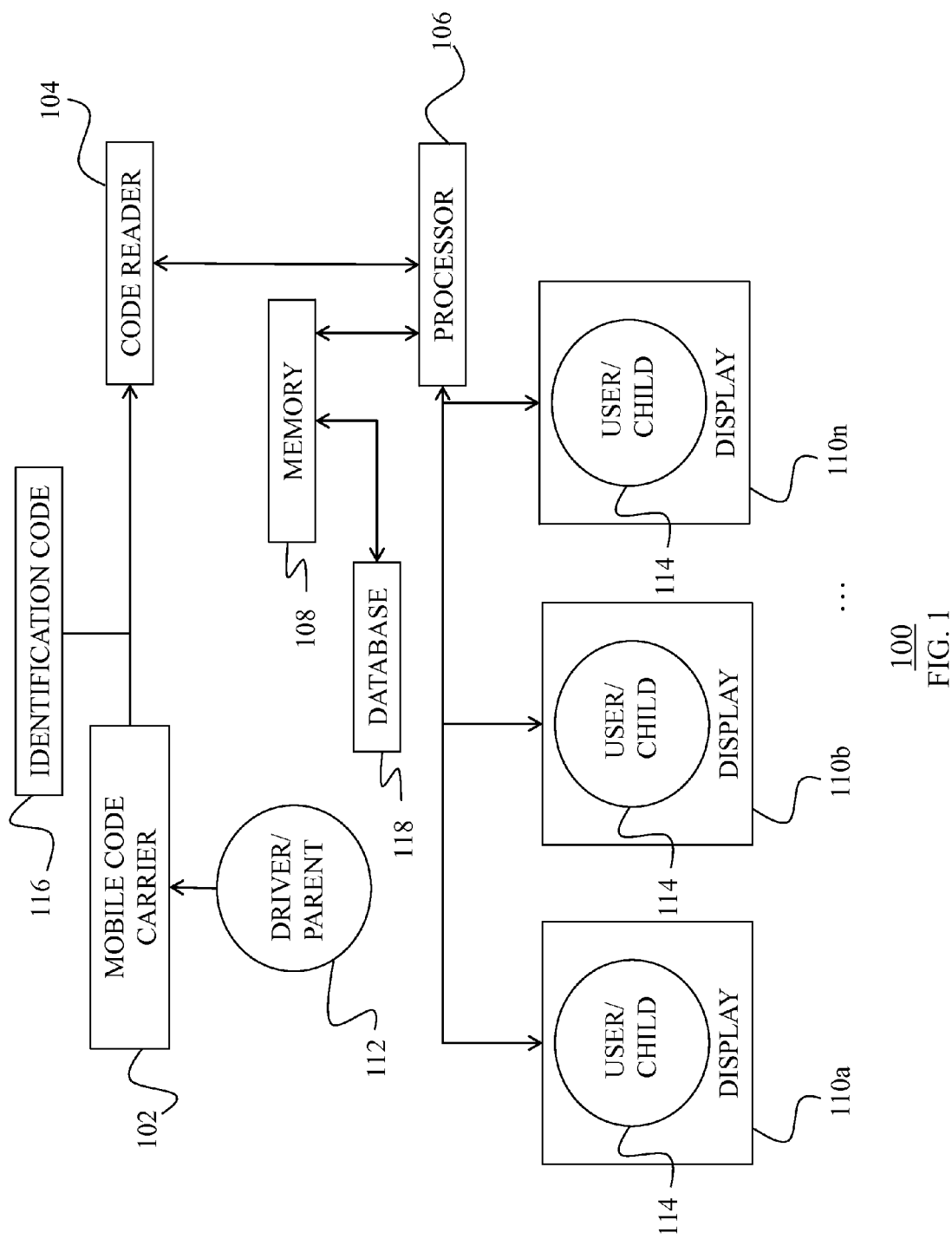
FIG. 1 is a schematic of a driver/parent arrival notification system having a mobile code carrier, a code reader, a processor, memory, and a plurality of displays in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system for identifying the arrival of a driver/parent and announcing that arrival to a specific location or person. Embodiments of the invention provide a mobile code carrier with an identifiable code associated with one or more persons and/or locations at an arrival destination. The novel system displays a message in the area where the user/child is located once the code carrier is read by one or more readers, the message announcing the presence on campus of a person or vehicle having the code carrier. The system and method described below advantageously notify the person responsible for the user/child associated with the identifiable code that someone is there to pick that user/child up. The system is particularly beneficial when there is a parent picking up multiple family members, a group pick-up for commercial transportation, or a parent picking up multiple children in a carpool without requiring the driver/parent to exit the vehicle.

Referring now to FIG. 1, a schematic representing one embodiment of a system facilitating the present invention is shown. FIG. 1 shows several advantageous features of the present invention, but, as will be described below, the invention and those devices implementing the invention can be provided in several shapes, sizes, combinations of features and components, and varying numbers and functions of the components.

The driver/parent identifying system 100, in its basic form, is shown having a mobile code carrier 102, a code reader 104, a processor 106, a memory 108, and a plurality of displays 110a-n, where n represents any number between zero and infinity and a-n represents any number of displays greater than or equal to two. The mobile code carrier 102 holds an identification code 116 that is generally associated with a driver/parent 112, or code holder, authorized to pick-up a target user/child 114, or more generally referred to herein as a "target." As will be discussed below, the identification code 116 may also be associated with another code holder that is not the driver/parent 112, such as a passenger or other person authorized to pick-up a user/child 114. Although a novel application of the system 100 applies to children being picked up by their parents, the present invention may also be appreciated by those skilled in the art to be applicable to any user waiting for the arrival of another person. The displays 110a-n, e.g., LCD monitors, are located within a building (not shown) where the user/child 114 is located. The term "building," although referenced herein as primarily being associated with having children located therein, shall not be so limited. The building may refer to any structure where displays 110a-n may be mounted to receive an identification code 116 from the code reader 104 and may have persons of all ages, passengers, and other persons located therein.

In one embodiment, the mobile code carrier 102 is a machine-readable storage medium capable of storing data, such as a barcode. In other embodiments, the mobile code carrier 102 is in the form a Bluetooth or radio frequency (RF) transmitter, such as RFID, magnetic ink characters, wireless data transmission, and the like. The carrier 102 is designed to be mobile, or capable of being easily transported, such that the driver/parent 112 may carry the carrier 102 along with him or her, or advantageously provide it to another family member or driver, whom he or she has authorized. In one embodiment, the mobile code carrier 102 is removably-couplable to a vehicle such that a driver/parent can just move their vehicle in front of or near the code reader 104, which will capture the identification code 116 stored on the carrier 102. The code reader 104 then transmits the identification code 116 to a processor 106. This ultimately leads to a quick and efficient process of picking up the user/child 114. In other embodiments, the carrier 102 may attach to another vehicle, may be carried on the driver/parent's 112 person, or other transportable object.

The code reader 104 is operable to identify the identification code 116 stored on the mobile code carrier 102 when the carrier 102 is in proximity to the code reader 104. In one embodiment, the code reader 104 is a bar code reader that includes all methods presently available in the art to retrieve the identification code 116 stored on the mobile code carrier 102. This process may also include a decoder to analyze the barcode image data before sending it to the processor 106. In other embodiments, the type of code reader 104 is dependent on the process utilized by the carrier 102 to store data, such that it will receive the stored data based on the storage technology. When in operation, the driver/parent 112 places the code carrier 102 within a sufficient distance of the code reader 104, to allow the identification code 116 to be read. This distance will vary depending on the code storage and transfer technology implemented.

As the details of data and digital transmission are generally known in the art, a detailed explanation as to the physical transfer of the identification code 116 will not be discussed. The identification code 116, however, will be associated with at least one driver/parent 112. In one embodiment, the identification code 116 is assigned at the outset or initial registration, i.e. when an operator assigns a mobile code carrier 102 to the driver/parent 112. In other embodiments, the identification code 116 may be transferred or associated with another driver/parent 112 by the operator or authorized person controlling and monitoring the system 100 after the code carrier 102 is issued to the driver/parent 112.

The identification code 116 is then transferred to the processor 106, which is communicatively coupled (indicated in FIG. 1 with double arrows) to the code reader 104 and memory 108. The memory 108 includes one or more programs that can be executed by the processor 106. The programs can cause the processor 106 to carry out at least one set of instructions that include accessing and searching the memory 108.

Figure 2:
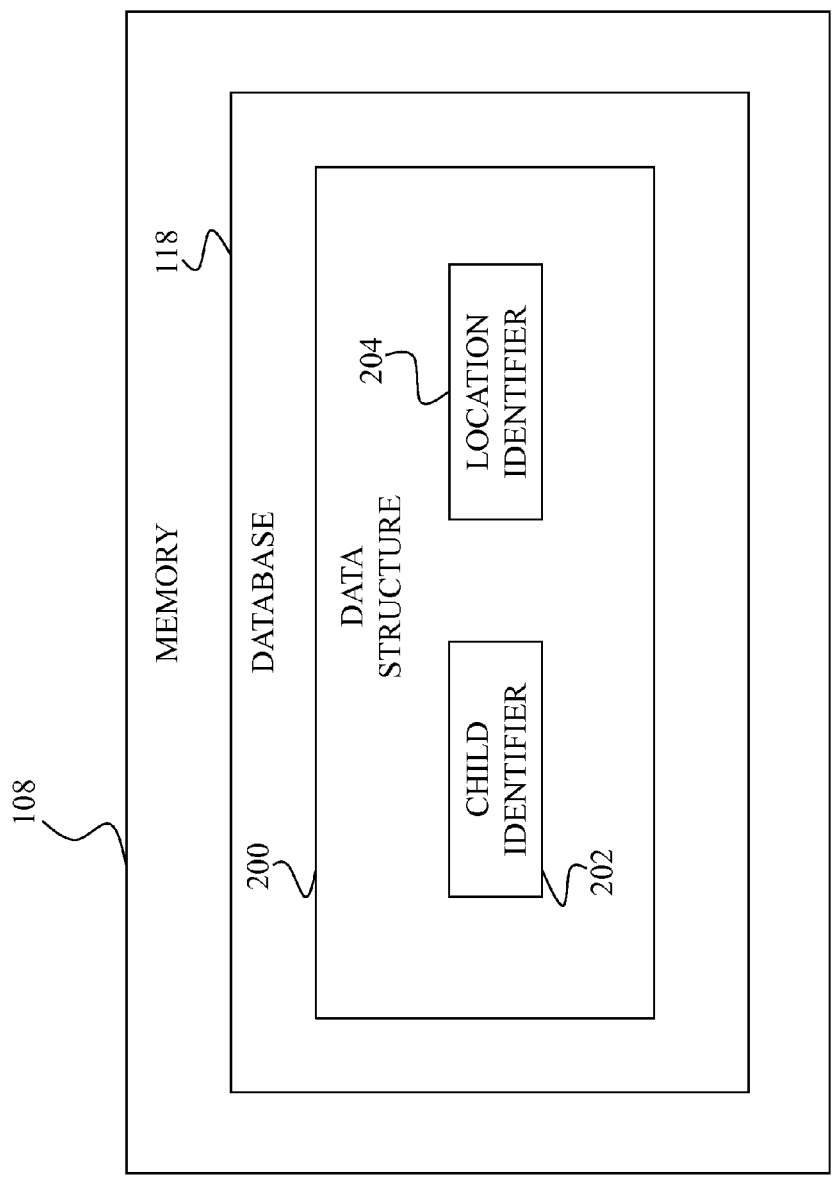
FIG. 2 is a bock diagram of the memory of FIG. 1 storing a database with a data structure that includes a child identifier or a location identifier in accordance with the present invention.

Now looking at FIG. 2, the memory 108 stores a database 118 which includes a data structure 200. In one embodiment, the data structure 200 associates the identification code 116 with one or more specific children or targets, specifically through a child identifier 202, and at least one location within the building, specifically through a location identifier 204. This exemplary memory structure can be seen in the block diagram of FIG. 2. The child identifier 202 is not necessarily be limited to a child, as the child identifier 202 may be used to identify any person, including adults, the provider/operator of the system 100 desires. It is also noted that the location identified by the location identifier 204 is not limited to a single location and can vary based on certain time intervals of the day.

The memory 108 may include one or more databases 118 and include one or more data structures 200 to allocate and associate the identification code 116 provided from the carrier 102. The term "data structure" is defined herein as any particular method of storing and organizing data. In one embodiment, the data structure includes one or more lookup tables. In other embodiments, the data structure is a B-tree, hash tables, arrays, or other methods of storing and organizing data. Table 1, below, shows an exemplary data structure 200 in accordance with one embodiment of the present invention.

TABLE 1

| | Location A | Location B | Location C | Location D | Location E | Location F |
|---|---|---|---|---|---|---|
| Child A | ID 001 | | | | | |
| Child B | | | ID 002 | ID 002 | | |

As one example, with reference to Table 1, a driver/parent 112 is provided with a mobile code carrier 102 and assigned an identification code 116, "ID 001." Upon receipt of the identification code 116, the processor 106 performs a data lookup in the memory 108 to determine the child identifier 202 and the location identifier 204 indicating where the child is within the building. In response, the processor will return the child identifier 202 of "Child A" and a location identifier 204 within the building of "Location A." In one embodiment, should the building have multiple locations as exemplified in Table 1, the identification code 116 will have both a child identifier 202 and two or more location identifiers 204 within the building, such as "Locations C & D" for "ID 002." In other embodiments, should the building only have one location within the building where a user/child 114 is being supervised or where he or she is waiting, then the child identifier 202 will be associated with the identification code 116 and, by default, only one location identifier. In further embodiments, should the driver/parent 112 be picking up multiple users/children 114 or targets, then the identification code 116 will be associated with a plurality of users/children and at least one location within the building, as discussed below.

Referring back to FIG. 1, the system 100 includes at least two displays 110a-n in at least one physical location within the building. A display, as referred to herein, is an output device for presentation of information in visual, audio, or tactile form (the latter used for example in tactile electronic displays for blind people). The input to the display is a series of electronic signals that the display interprets and converts to visual, tactile, and/or auditory outputs. Common applications for electronic visual displays are television sets or computer monitors. So that each display 110a-n can relay information to the user/child 114, the displays 110a-n will be communicatively coupled to the processor 106. The system 100 has a plurality of displays 110a-n, each located in one of a plurality of locations within the building, depending on the amount of locations in the building and the distribution of users/children 114 at each location. More specifically, each classroom in a school can be provided with one or more displays that are each individually addressable by the processor 106. Now, advantageously, a driver/parent 112 may be associated to a user/child 114 with one location or multiple locations within a building. This is particularly suitable for those situations where schools or the custodians of the user/child 114 provide multiple rooms or areas within the building for the user/child 114 to occupy.

After determining both the child identifier 202 and the location identifier 204, at least one of the displays 110a-n at the at least one location indicates the identity of the identification code 116 stored on the mobile code carrier 102. The displays 110a-n are generally placed in areas near each user/child 114 so that he or she will be notified when the driver/parent 112 arrives. As a corollary, the supervising party or custodian will also notice the arrival of the driver/parent 112 and dismiss the child, but their notification will not be necessarily required. The intended effect will be that other persons in the areas where the displays 110a-n are located will be minimally interrupted, which is specifically important, for example, in situations where testing or teaching is done. In another embodiment, just the custodian of the user/child 114 is notified of the driver/parent's arrival.

When the location identifier 204 is determined, one the plurality of displays 110a-n indicates a predetermined message related to the target. In one embodiment, the actual identification code 116 stored on the mobile code carrier 102 is the message indicated on the display 110. In other embodiments, depending on the logistics of the location(s) and/or building, the actual identification code 116 stored on the carrier 102 is indicated on any one or more of the plurality of displays 110a-n in one of a plurality of different locations within the building. The code 116 may be indicated visually by text on one of the plurality of displays 110a-n and may also include lighting to indicate the arrival of the driver/parent 112. In another embodiment, the arrival of the driver/parent 112 is indicated with little, or substantially no auditory sound. This provides a relatively interruption free environment, while still providing a quick and efficient notification to a user/child 114 of the driver/parent's 112 arrival.

As previously discussed, in another embodiment of the present invention, the identification code 116 is associated with a plurality of targets, i.e., users/children 114, and at least one location within a building, but generally more than one location. To identify those targets, the data structure 200 associates the code 116 with a plurality of child identifiers 202 and one or more location identifiers 204 within the building. Table 2, below, shows an exemplary data structure 200, in the form of a lookup table, reflecting a scenario where there are multiple child and location identifiers 202, 204 associated with the identification code 116.

TABLE 2

|  | Location A | Location B | Location C | Location D | Location E | Location F |
|---|---|---|---|---|---|---|
| Child A | ID 001 |  |  |  |  |  |
| Child B |  |  |  | ID 002 |  |  |
| Child C |  | ID 003 |  | ID 004 | ID 008 |  |
| Child D | ID 004 |  |  |  | ID 008 | ID 004 |
| Child E |  | ID 005 | ID 005/ ID 006/ ID 007 |  | ID 008 |  |
| Child F |  |  |  |  | ID 008 |  |
| Child G |  | ID 006 |  |  |  |  |

For example, "ID 004" is associated with two child identifiers 202, Child C and Child D, each associated with a different location identifier 204. This scenario would occur in situations, for example, where one parent is picking up two children, where each child is located in a separate location within a building, i.e. "Locations A and F" and "Location D," respectively. It can be observed that Child D may also have more than one potential locations, i.e. Locations A and F, depending on the time of day, day of the week, or semester.

Another, or the same, data structure 200 may also be used to categorically organize the child or location identifiers 202, 204 with a period of time during the day or day of week on which the code 116 is received from the code reader 104. One example of utilizing the time/day variable would include first associating the code 116 with a child identifier 202. The child identifier 202 would then be associated with another data structure 200 where the location identifier 204 is then dependent on the time/day variable received by the code reader 104 or other device in the system 100 capable of associating the code 116 with a time/day variable.

Table 2 also exemplifies a situation where multiple identification codes 116 are associated with one or more child and location identifiers 202, 204. For example, child identifier 202 "Child E" has three codes 116 ("ID 005," "ID 006," and "ID 007") associated with it. Each code may represent an authorized driver/parent 112 who is picking up the user/child 114. Now, multiple drivers/parents 112 may be associated with one or more users/children 114 and each child/user 114 will be indicated of the arrival by display 110 in the area where the location identifier 204 places them. This also is particularly beneficial for drivers/parents 112 who carpool on certain days, such that his or her code will alert all of the users/children 114 he or she will be picking up. The carpool scenario is represented in Table 2 by the code 116 "ID 008," such that when ID 008 is read by the code reader 104, children C through F will be notified. This accomplishes the often difficult task of keeping track and authorizing which children 114 are associated with the carpool parent. As the users/children 114 are generally released at the same time, the pickup area will be presumably free of other users/children 114 which have not been notified, which increases the safety of the users/children 114 being released from the supervising adult or child custodian.

In one embodiment, the child and location identifiers 202, 204 will be updated and regulated by the operating/supervising party or entity, such as a school or train station. In other embodiments, the information may be updated and regulated by drivers/parents 112 or authorized users/children 114 that have access to the database through wireless authentication protocol, generally requiring a username and password, or other known methods of updating stored information.

Figure 3:
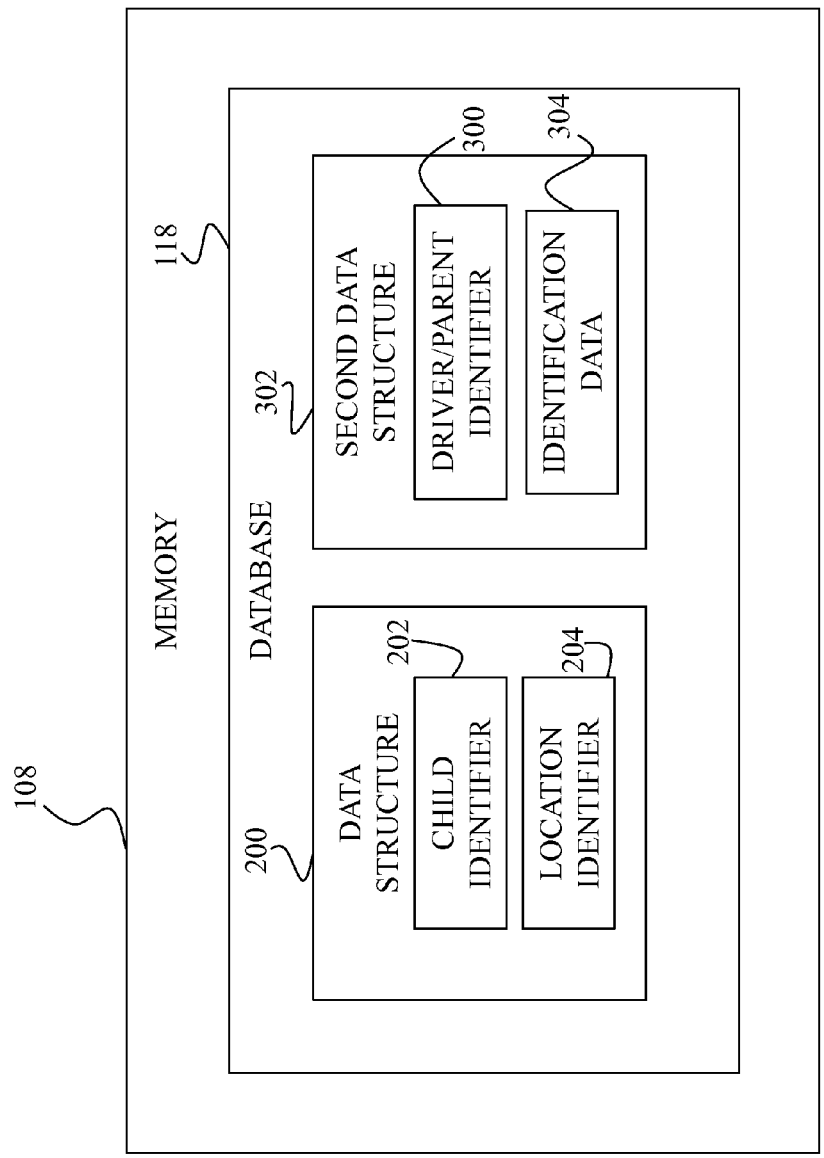
FIG. 3 is a block diagram of the memory having a second data structure that includes a driver/parent identifier and identification data in accordance with an additional embodiment of the present invention.

Referring now to FIG. 3, in order to identify and associate the code 116 with a particular code holder's information, a driver/parent identifier 300 is implemented. One embodiment includes having a second data structure 302 within a database 118, which may or may not necessarily be the database 118 previously utilized. As such, the processor 106 would associate the code 116 with the target, the at least one location within the building, and the code holder. The code 116 may also be associated with a predetermined driver/user identification data 304 when carrier 102 is first given to the driver/parent 112, but also may be updated after, as discussed below. As previously discussed, the code 116 may be itself displayed on one of the displays 110a-n. In other embodiments, however, the code 116 may also be associated with the driver/parent identifier 300, either before or after the code 116 is associated with either the user/child or location identifiers 202, 204. Table 3, below, exemplifies the second data structure 302, utilizing a variety of driver/parent identifiers 300 and identifying data 304.

TABLE 3

|  | Black Cadillac/ Acura | Black Acura | Terminal 5 | Blue Ford | White Rolls- Royce |
|---|---|---|---|---|---|
| Mr. and Mrs. Johnson | ID 001 | | | | |
| Mr. Johnson | | ID 002 | | | |
| Mr. and Mrs. Smiley | | | | | ID 003 |
| Mr. Smith | | | | ID 004 | |
| Train 005 | | | ID 005 | | |

For example, the identification code 116 "ID 001" is associated with the driver/parent identifier 300 "Mr. and Mrs. Johnson" and corresponding identifying data 304 "Black Cadillac/Acura." This situation would be applicable to an identification code 116 associated with a particular family, such that both parents could exchange mobile code carriers 102 and the family name and make and/or color of car would be indicated on the display 110. Other situations may include codes 116 associated with individual drivers/parents, such as only "Mr. Johnson" or should the present invention be applied in the commercial setting, "Train 005." In one embodiment, either or both of the driver/parent identifier 300 or identifying data 304 may be omitted. In other embodiments, driver/parent identification data 304 differs from the driver/parent identifiers 300, as the data 304 may refer to various data associated with driver/parent 112 that does include their name. In other embodiments, the identifiers 300 and data 304 may include the same information. Having at least the driver/parent identifiers 300 facilitates tracking who is picking up the users/children 114. There are various combinations and variables that may be inserted into the driver/parent identifiers 300 and/or identifying data 304. Similar to the user/child and location identifiers 200, 202, this information would be updated and/or regulated by the operating/supervising party or entity, or the drivers/parents 112 themselves. The system 100 may also have the ability to save the identifiers 300 and/or data 304 for record keeping purposes and to monitor who is picking up the users/children 114.

Figure 4:
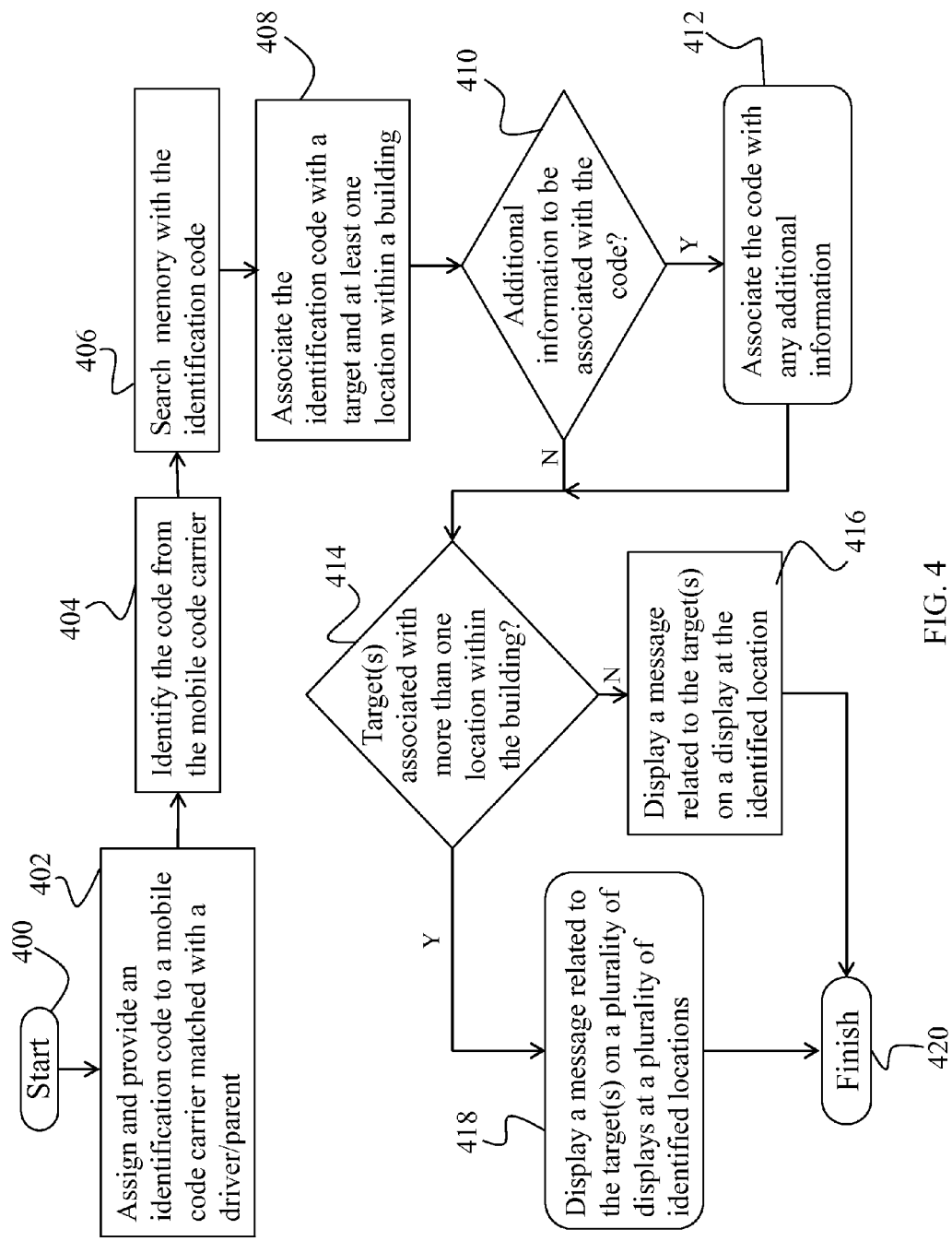
FIG. 4 is a process flow diagram of a method of notifying a user/child of a driver/parent's arrival in accordance with the present invention.

FIG. 4 shows a process flow diagram of the method utilized for notifying the user/child 114 of a driver/parent's 112 arrival. The process starts at step 400 and moves directly to step 402. In step 402, an identification code 116 is assigned to the code carrier 102 and matched to a particular driver/parent 112. The driver/parent 112 is now provided with an associated code 116 that is transportable on the carrier 102 and operable to be scanned by the driver/parent 112 or any authorized representative. In the next step 404, the driver/parent 112 moves the code carrier 102 in proximity to the code reader 104, enabling the code reader 104 to interpret the identification code 116. An intermediate step, not shown, transmits the identification code 116 to the processor for processing. In the next step 406, the processor 106 searches the memory 108 for one or more records/information associated with the identification code 116.

The process then moves to step 408, where the code 116 is associated with, at a minimum, a target and at least one location within a building. The target may be any person interested in being a passenger of the driver/parent connected with the child identifier 202, but, as set forth herein, is specifically advantageous for a child awaiting pick-up by his or her parents. In one embodiment, the targets can be pets, e.g., dogs, awaiting pickup by their owners.

The next step 410 includes querying whether there is any additional information to be associated with the code 116. If the response is "yes," then the next step 412 would require the system 100 to associate the code with any additional information located on the database. This step 412 includes associating the code 116 with any code holder information such as the driver/parent identifier 300 or identification data 304 or information relating to the time/day/month of the year or any other information desired by the operator of the system 100. As discussed above, the code 116 may also be associated with family, car pool, and other identifying information. If the response to the query is "no," or after the step 412 associates any additional information with the code 116, the process continues to step 414. Although the step 412 of associating the code 116 with any additional information is reflected as occurring after the intermediate step 410 of querying for additional information, in other embodiments, step 412 may also be included in step 408. As a corollary, step 410 may also be included in step 406 or the processor 106 may not execute step 410. The steps 408, 412 may be formed in a linear fashion or the processor 106 may perform one or more iterations to arrive at associating any supplied parent/driver information with the code 116.

Step 414 queries whether there is one or more targets associated with a plurality of locations within the building. If the response to query is in the "no," then the process continues to step 416. In step 416, one of the plurality of displays, at an identified location, displays a message related to one or more of the designated targets. If a code 116 is associated with multiple targets, then the display would display information related to at least one of the targets, e.g. displaying that the parent of two children has arrived. Other embodiments may display certain information related to each target, e.g. the name of each child. If the response to the querying step 414 is "yes," then the process continues to step 418. In step 418, a plurality of displays, at a plurality of identified locations, displays a message relating to the target(s). Displaying to the plurality of displays may be done, as per step 418, simultaneously or sequentially, as desired. If there are one or more targets located at different locations, then multiple displays will indicate a message. This is particularly beneficial in situations where parents have two or more children located at different locations, e.g. different classrooms, within the building. Steps 416 and 418 directly continue to step 420, which concludes the process. This process advantageously provides a method of not only associating, but displaying, messages relating to the target, i.e. child or custodian of child, at various locations or areas within the building, which was not accomplished with the prior-art notification systems.

Figure 5:
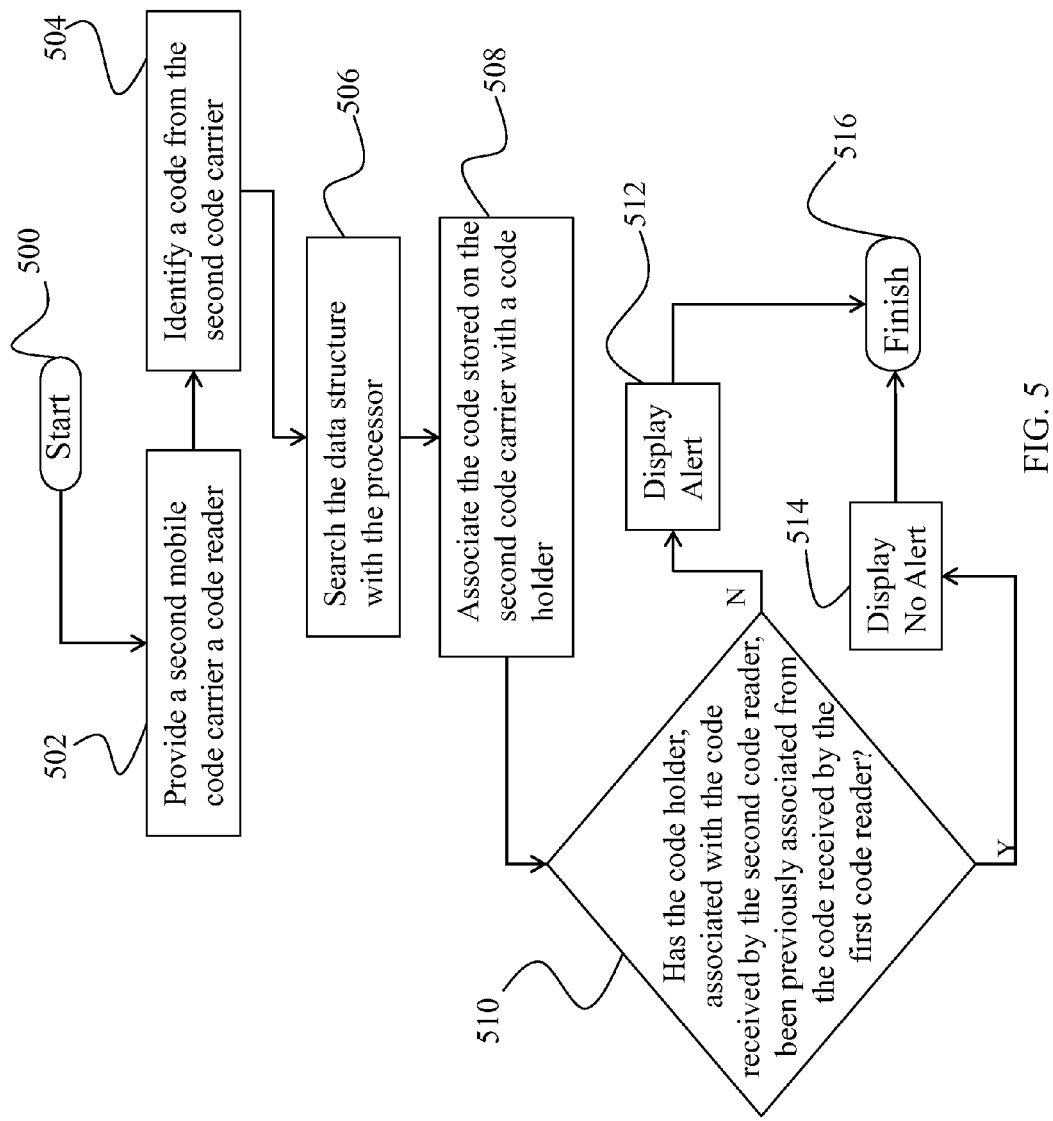
FIG. 5 is a process flow diagram of an additional embodiment of the method of FIG. 4, including associating the code from a second code carrier to a code holder and displaying an alert under certain conditions to the custodian of the child in accordance with the present invention.

FIG. 5 provides a process flow diagram illustrating a further embodiment of the present invention. The process begins at step 500 and then proceeds directly to step 502. Step 502 includes providing a second mobile code carrier which now would be issued to the user/child 114. The second mobile code carrier has a code associated with the user/child 114. Similar to the previously mentioned code carrier, a second code reader is located at a location within the building and is operable to identify the code stored on the second mobile code carrier when the second mobile code carrier is in proximity to the second code reader. As such, step 504 includes identifying the code from the second mobile code carrier with the second code reader. Next, similar FIG. 4, step 506 includes searching the data structure with the processor, which may or may not be the same processor 106 or database 118 discussed previously.

The process continues to step 508, which includes associating the code stored on the second mobile code carrier with a code holder. As also previously discussed, a code holder may be associated with a parent identifier 300 or other information associated with the driver/parent 112. When a user/child 114 is notified that his or her driver/parent 112 has arrived in accordance with the aforementioned inventive system 100, the user/child 114 will then scan the second mobile code carrier before leaving the premises to verify and account for the user/child 114 being dismissed. As such, step 510 involves querying whether the code holder (associated with the code scanned from the second code reader) has been previously associated from the code received by the first code reader 104. If the response to the query is "no," then the user/child 114 is attempting to check-out before being notified and the process continues to step 512.

Step 512 includes displaying an alert to one of the plurality of displays at the at least one location associated with the code 116 in order to notify the user/child 114 and/or custodian. If the response to the query is "yes," then step 514 includes not displaying an alert. Both steps 512 and 514 directly conclude at step 516. In one embodiment, the alert displayed to the user/child and/or custodian is only visual. In other embodiments, the alert may be auditory or other means of alerting the user/child 114 and/or custodian. The operator of the system 100 may determine the time interval in which the code 116 was previously scanned by the first code reader 104 in order to determine whether to alert. In further embodiments, the operator may simply reset any code holder(s) previously checked-in during the day, each night so that the alert will/will not be falsely indicated by a code scanned the day before.

A user/child notification system and method of using the same has been disclosed that includes a mobile code carrier that is given to drivers/parents with children at a particular destination. The carrier has an identification code associated with it that is automatically read by a code reader when the parent arrives at the destination. Once the code is read, a display or audible alert is activated only in the room where the child belonging to that parent is located. The inventive system allows children to be dismissed from school only when their parent is present and ready to receive them and does so in a discrete and orderly fashion. The system also allows unique notifications to be displayed in more than one location where a driver/parent is responsible for picking up multiple children that are in multiple locations within a building, e.g., separate classrooms.

The invention claimed is:

1. A method of announcing a person's arrival, the method comprising:
   providing:
      a mobile code carrier;
      a code reader operable to identify a code stored on the mobile code carrier when the mobile code carrier is in proximity to the code reader;
      a processor communicatively coupled to the code reader;
      a memory communicatively coupled to the processor and storing a data structure associating the code with a person, at least one target, wherein the at least one target is at least one of a user, a child, and a pet, and at least one location where the target is located within a building; and
      a plurality of displays each located in one of a plurality of different locations within the building and each communicatively coupled to the processor,
   identifying the code from the mobile code carrier with the code reader;
   searching the data structure with the code and identifying the at least one target and the at least one location where the at least one target is located within the building; and
   displaying to one of the plurality of displays at the at least one location within the building a predetermined message uniquely related to the at least one target.

2. The method according to claim 1, further comprising:
   searching the data structure with the code to identify a first location where a first target is located within the building and a second location where a second target is located within the building;
   displaying to one of the plurality of displays at the first location a predetermined message uniquely related to the first target; and
   displaying to one of the plurality of displays at the second location a predetermined message uniquely related to the second target.

3. The method according to claim 1, wherein:
   the mobile code carrier is removably couplable to a vehicle.

4. The method according to claim 1, wherein the mobile code carrier is at least one of:
   a bar code; and
   an RF transmitter.

5. The method according to claim 1, wherein:
   the building is a school and the plurality of different locations are classrooms within the school.

6. The method according to claim 1, wherein:
   the predetermined message related to the at least one target is an instruction to a teacher to dismiss a particular child.

7. The method according to claim 1, wherein the predetermined message uniquely related to the at least one target comprises at least one of:
   an identifier of the at least one target; and
   an identifier of a person in possession of the mobile code carrier.

8. The method according to claim 1, wherein:
   the data structure includes at least one lookup table.

9. The method according to claim 1, further comprising:
   providing:
      a target code carrier having a second code associated with the at least one target; and a second code reader located proximate the building and communicatively coupled to the processor, the second code reader operable to identify the second code stored on the target code carrier when the target code carrier is in proximity to the second code reader;

identifying the second code from the target code carrier with the second code reader;

searching the data structure for the second code to determine a code holder associated therewith; and displaying to one of the plurality of displays an alert when the code holder associated with the second code is not currently identified by the code reader as being present.

10. A driver/parent identifying system comprising:
a mobile code carrier;
a code reader operable to identify a code stored on the mobile code carrier when the mobile code carrier is in proximity to the code reader;
a processor communicatively coupled to the code reader;
a memory communicatively coupled to the processor and storing a data structure associating the code with at least one of a person and a vehicle, at least one target, wherein the at least one target is at least one of a user, a child, and a pet, and at least one location where the at least one target is located within a building; and
a plurality of displays each located in one of a plurality of different locations within the building and each communicatively coupled to the processor,
wherein upon receiving from the code reader an identification of the code stored on the mobile code carrier, the processor searches the memory to identify the at least one location where the at least one target is located within the building and causes one of the plurality of displays at the at least one location to display a predetermined message uniquely related to the at least one target.

11. The driver/parent identifying system according to claim 10, wherein:
the mobile code carrier is removably couplable to a vehicle.

12. The driver/parent identifying system according to claim 10, wherein:
the mobile code carrier is at least one of:
a bar code; and
an RF transmitter.

13. The driver/parent identifying system according to claim 10, wherein:
the building is a school and the plurality of different locations are classrooms within the school.

14. The driver/parent identifying system according to claim 13, wherein:
the predetermined message related to the at least one target is an instruction to a teacher to dismiss a particular child.

15. The driver/parent identifying system according to claim 10, wherein:
the at least one target is at least two people;
the at least one location is at least two rooms, with one of the at least two people each being in a separate one of the at least two rooms; and
upon receiving from the code reader an identification of the code stored on the mobile code carrier, the processor displays a message on a display in a first of the at least two rooms and not on a display in a second of the at least two rooms.

16. The driver/parent identifying system according to claim 10, wherein the predetermined message uniquely related to the at least one target comprises at least one of:
an identifier of the at least one target; and
an identifier of a person in possession of the mobile code carrier.

17. The driver/parent identifying system according to claim 10, wherein:
the data structure includes at least one lookup table.

18. A driver/parent identifying system comprising:
a school building located on a school campus and having at least a first classroom and a second classroom;
a first electronic display monitor in the first classroom and a second electronic display monitor in the second classroom;
a mobile code carrier coupled to an automobile;
a code reader on the school campus and operable to identify a code stored on the mobile code carrier when the mobile code carrier enters the campus;
a processor communicatively coupled to the code reader and the first and second display monitors; and
a memory communicatively coupled to the processor and storing a data structure associating the code with a first student present within the school building, a guardian of the first student present within the school building, and a location where the first student present within the school building is located,
wherein upon receiving from the code reader an identification of the code stored on the mobile code carrier, the processor searches the memory to identify the first student present within the school building and the location where the first student present within the school building is located and displays a predetermined message on the first display when the first student present within the school building is located in the first classroom and displays the predetermined message on the second display when the first student present within the school building is located in the second classroom.

19. The driver/parent identifying system according to claim 18, wherein:
the data structure further associates the code with a second student present within the school building and a location where the second student present within the school building is located and, upon receiving from the code reader an identification of the code stored on the mobile code carrier, the processor searches the memory to identify the second student present within the school building and the location where the second student present within the school building is located and displays a predetermined message on the first display when the second student present within the school building is located in the first classroom and displays the predetermined message on the second display when the second student present within the school building is located in the second classroom.

20. The driver/parent identifying system according to claim 18, wherein:
the predetermined message is a message indicating that the guardian of the first student has arrived on campus.

* * * * *